United States Patent
Matthews

(10) Patent No.: US 9,064,345 B2
(45) Date of Patent: Jun. 23, 2015

(54) COMPRESSING DATA REPRESENTING COMPUTER ANIMATED HAIR

(71) Applicant: DreamWorks Animation LLC, Glendale, CA (US)

(72) Inventor: Mark Jeffrey Matthews, Los Angeles, CA (US)

(73) Assignee: DreamWorks Animation LLC, Glendale, CA (US)

( * ) Notice: Subject to any disclaimer, the term of this patent is extended or adjusted under 35 U.S.C. 154(b) by 0 days.

(21) Appl. No.: 13/830,943

(22) Filed: Mar. 14, 2013

(65) Prior Publication Data

US 2014/0270561 A1    Sep. 18, 2014

(51) Int. Cl.
*G06K 9/00*      (2006.01)
*G06T 13/40*    (2011.01)
*G06T 9/00*      (2006.01)

(52) U.S. Cl.
CPC ............. *G06T 13/40* (2013.01); *G06T 9/001* (2013.01); *G06T 9/008* (2013.01)

(58) Field of Classification Search
CPC ........... G06T 9/008; H04N 7/28; H04N 7/50; H04N 7/30; H04N 7/26244; H04N 7/26313; H04N 7/26106; H04N 7/26765; H04N 7/361; H04N 7/462
USPC ............... 382/232, 236, 253, 117, 118, 225; 132/237, 238; 345/418, 419, 473, 420, 345/474; 606/9, 16, 43; 375/240.16
See application file for complete search history.

(56) References Cited

U.S. PATENT DOCUMENTS

| | | | |
|---|---|---|---|
| 6,050,990 A * | 4/2000 | Tankovich et al. | 606/9 |
| 7,609,261 B2 | 10/2009 | Gibbs et al. | |
| 7,631,646 B2 * | 12/2009 | Ragosta et al. | 132/237 |
| 7,872,654 B2 | 1/2011 | Scapel et al. | |
| 2003/0179203 A1 | 9/2003 | Bruderlin et al. | |
| 2010/0156902 A1 | 6/2010 | Kim et al. | |
| 2010/0277475 A1 | 11/2010 | McAdams et al. | |
| 2011/0299776 A1 | 12/2011 | Lee et al. | |

OTHER PUBLICATIONS

Koh et al., "A Simple Physics Model to Animate Human Hair Modeled in 2D Strips in Real Time", School of Computing, NUS, Singapore 117543, 9 pages.

International Search Report and Written Opinion received for PCT Patent Application No. PCT/US2014/029395, mailed on Oct. 23, 2014, 9 pages.

(Continued)

*Primary Examiner* — Anh Do
(74) *Attorney, Agent, or Firm* — Morrison & Foerster LLP

(57) ABSTRACT

Data representing animated hair in a computer generated imagery (CGI) scene may be compressed by treating hair data as arrays of parameters. Hair data parameters may include control vertices, hair color, hair radius, and the like. A principal component analysis (PCA) may be performed on the arrays of hair data. PCA may yield new basis vectors, varying in length, with the largest basis vector corresponding to a new dimension with the largest variance in hair data. The hair data may be quantized based on the varying lengths of new basis vectors. The number of bits allocated for quantizing each new dimension corresponding to each new basis vector may be determined based on the relative lengths of new basis vectors, with more bits allocated to dimensions corresponding to longer basis vectors. The quantized hair data may be bit-packed and then compressed using lossless entropy encoding.

30 Claims, 10 Drawing Sheets

(56) References Cited

OTHER PUBLICATIONS

Turk et al., "Eigenfaces for Recognition", Journal of Cognitive Neuroscience, vol. 3, No. 1, 1991, pp. 71-86.

Invitation to Pay Additional Fees received for PCT Patent Application No. PCT/US2014/029395, mailed on Aug. 7, 2014, 2 pages.

Sattler et al., "Simple and Efficient Compression of Animation Sequences", Eurographics/ACM SIGGRAPH Symposium on Computer Animation, 2005, 9 pages.

* cited by examiner

COMPRESSING DATA REPRESENTING COMPUTER ANIMATED HAIR

BACKGROUND

1. Field

This application relates generally to digital data compression and, more specifically, to computer systems and processes for compressing data representing computer animated hair.

2. Related Art

Improvements in computer generated imagery (CGI) have enabled computer animated films to portray very fine animation detail, giving animated characters a remarkable realism. Clothing, hair, facial expressions, scene backgrounds, and the like are becoming increasingly complex, leading to animated films with visually stunning effects. The added complexity and remarkable level of detail, however, may come at the cost of managing dramatically larger amounts of digital data. Although the cost of storing digital data has decreased over the years, additional complexity and detail in each frame of an animated film may result in such large amounts of data that long-term storage of full hair geometry data, for example, may be untenable, leaving film studios to store only the initial data needed to generate hair geometry or digitally captured film sequences. Because the size of processed hair geometry data can make storing it impractical, artists, animators, riggers, and the like working with an animated character or scene may frequently have to re-process or re-render characters or scenes during film production. In many cases, artist time and computation time lost to re-processing scene data can be very costly.

Of the various animated scene elements that give animated films enhanced realism, finely detailed hair, fur, grass, and the like can have a particularly significant impact on viewers. However, the processed versions of these fine details can occupy such a large amount of data storage that the data is discarded soon after it is used to animate a frame, to capture a film sequence, or the like. For example, processed data representing a complete hair style may include all of the geometric positions and attributes (e.g., radius, color, etc.) of every single hair in a CGI scene, and such massive data may be discarded once the scene is captured or otherwise used. Film studios may thus re-generate visual hair effects each time they are needed and opt to work without processed hair in many instances. However, storing processed hair data and making it available to artists on demand could reduce or eliminate significant regeneration time, wasted artist time, and wasted computation resources.

Thus, systems and processes for compressing animated hair data are desired.

SUMMARY

Systems and processes for compressing data representing animated hair in a CGI scene are described. Data representing animated hair may be received. The data may include arrays of hair data parameters. New basis vectors may be determined for the arrays of hair data parameters using principal component analysis (PCA). The number of new basis vectors may correspond to the number of hair data parameters in an array. An allocation of bits to dimensions may be determined corresponding to the new basis vectors based on the relative lengths of the new basis vectors. The new basis vector with the greatest length may be allocated more bits than a new basis vector that is shorter. The hair data may be quantized in the dimensions corresponding to the new basis vectors based on the allocation of bits. The quantized hair data may be bit-packed. The bit-packed quantized hair data may be compressed using lossless compression. The compressed hair data may be stored.

In compressing the hair data, the number of hair data points to allocate to a quantization segment may be determined by dividing a total number of hair data points by $2^N$, where N is a number of bits allocated to a dimension. Quantization segments may be formed with non-uniform widths in a dimension in order to capture the determined number of hair data points. Some dimensions may be allocated zero bits for quantization. Lossless compression may include performing a Lempel-Ziv entropy encoding of the bit-packed quantized hair data Systems and processes for decompressing and reconstructing compressed data representing animated hair in a CGI scene are described. A set of basis vectors may be received corresponding to a PCA performed on uncompressed arrays of hair data parameters. Compressed data representing animated hair may be received. A lossless decompression of the compressed hair data may be performed. The decompressed hair data may include arrays of hair data parameters that were transformed from an original basis to a new basis corresponding to the set of basis vectors. The transformed arrays of hair data parameters may be mapped into new arrays of hair data parameters in dimensions corresponding to the original basis to reconstruct the decompressed hair data.

In decompressing and reconstructing the hair data, referential quantization values in the decompressed hair data may be mapped to corresponding real data values. Stored hair data parameters may be received. Null parameters in the new arrays of hair data parameters may be populated with the stored hair data parameters. The null parameters may correspond to un-quantized domains in the new basis.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

Figure 1:
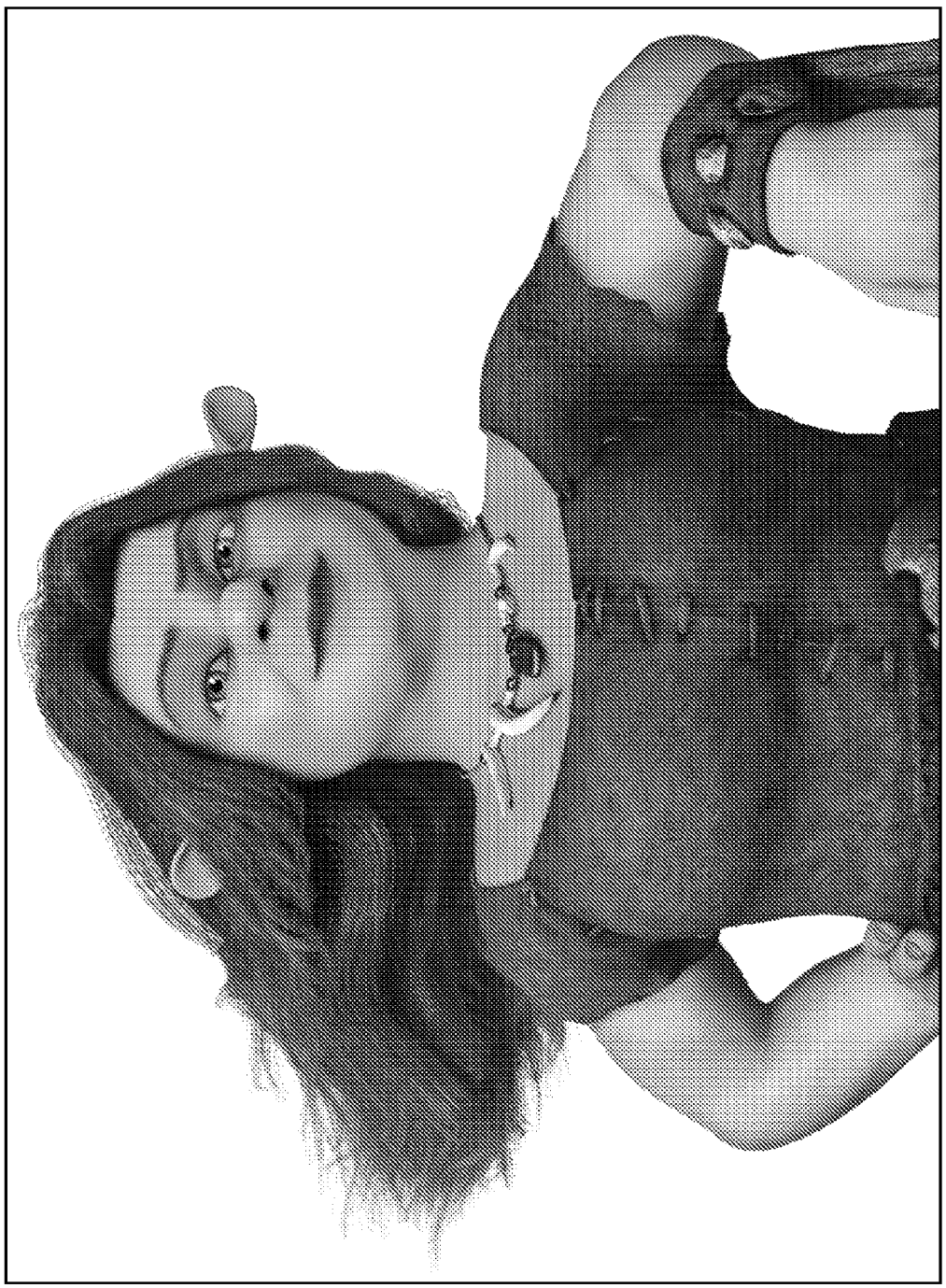
FIG. 1 illustrates an exemplary computer-generated animation character.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various embodiments are described below relating to systems and processes for compressing digital data representing computer animated hair, fur, grass, leaves, and the like. Computer animated hair may include stationary computer-generated hair in a scene, hair that is animated to show movement frame after frame, or any other hair generated via a computer for animated film applications. An exemplary compression process may include receiving data representing processed hair in a CGI environment. Processed hair data may include information describing hair location, hair geometry, hair color, hair radius, and the like. A PCA may be performed on the hair data for many or all individual hairs of a particular character in a scene or for all hair in a scene. PCA may yield new basis vectors, varying in length, with the largest basis vector corresponding to a new dimension with the largest variance (i.e., where individual points are the most spread out), progressively down to the smallest basis vector corresponding to the dimension with the smallest variance (i.e., where individual points are most tightly clustered together). In some embodiments, the original arrays of hair data may be transformed into the new dimensions defined by the new basis vectors.

With a new basis defined and the dimensions with the largest variance identified, a quantization of the data may be performed to compress the data. The data fidelity (or conversely the quantization error or amount of data loss) may be determined by the number of bits allocated for representing each set of hair data parameters (each array). More bits may allow for better fidelity and less data loss, but fewer bits may lead to smaller compressed data. The number of bits allocated to each basis vector may correspond to the relative sizes of the basis vectors. For example, the dimension with the largest basis vector may be allocated the largest number of bits, thereby providing the most detail to the dimension with the most data variance among individual hair data points. In contrast, the dimension with the smallest basis vector (i.e., the dimension of a hair data cluster with the least variance) may be allocated the fewest number of bits—or may not be allocated any bits at all—as there may be little or no difference among individual hair data points in that dimension.

After quantizing the data in the various dimensions, a standard lossless entropy compression technique may be used to compress the quantized data without further loss. Beneficially, compressing hair data as described herein may take advantage of the similarities between individual hairs in a scene to compress the data while still preserving the important differences between individual hairs. Although such compression may have significant quantization error, the compressed data may still prove useful to animators, artists, and the like, reducing wasted geometry generation or processing time and wasted computer resources. Moreover, various modifications to compression techniques discussed herein may allow users to customize the impact of compression, and the various techniques discussed herein may also be applied to other types of data. For example, although hair data is used to illustrate the techniques discussed herein, the techniques may also be used to compress various other types of animation data such as blades of grass, leaves on trees, fur, scales, clothing, ornaments, or the like. Accordingly, the various embodiments and examples discussed herein should be considered illustrative, with many other applications readily recognizable by those of ordinary skill in the art.

FIG. 1 illustrates an exemplary computer-generated animation character. Notably, the animated character is illustrated with a significant amount of hair detail. Data corresponding to the fine detail of the character's hair may be sizable. For example, the data may include all of the geometric positions and attributes (e.g., radius, color, etc.) of every single hair in the character's hair style. Due to the size of the data, film studios may prefer not to store the complex hair data. However, the various compression systems and processes discussed herein may make storing processed hair data more economical, which may eliminate wasted regeneration time, computation resources, and artist time, while providing enhanced flexibility to artists to readily view full resolution hair without re-processing the hair data.

Figure 2:
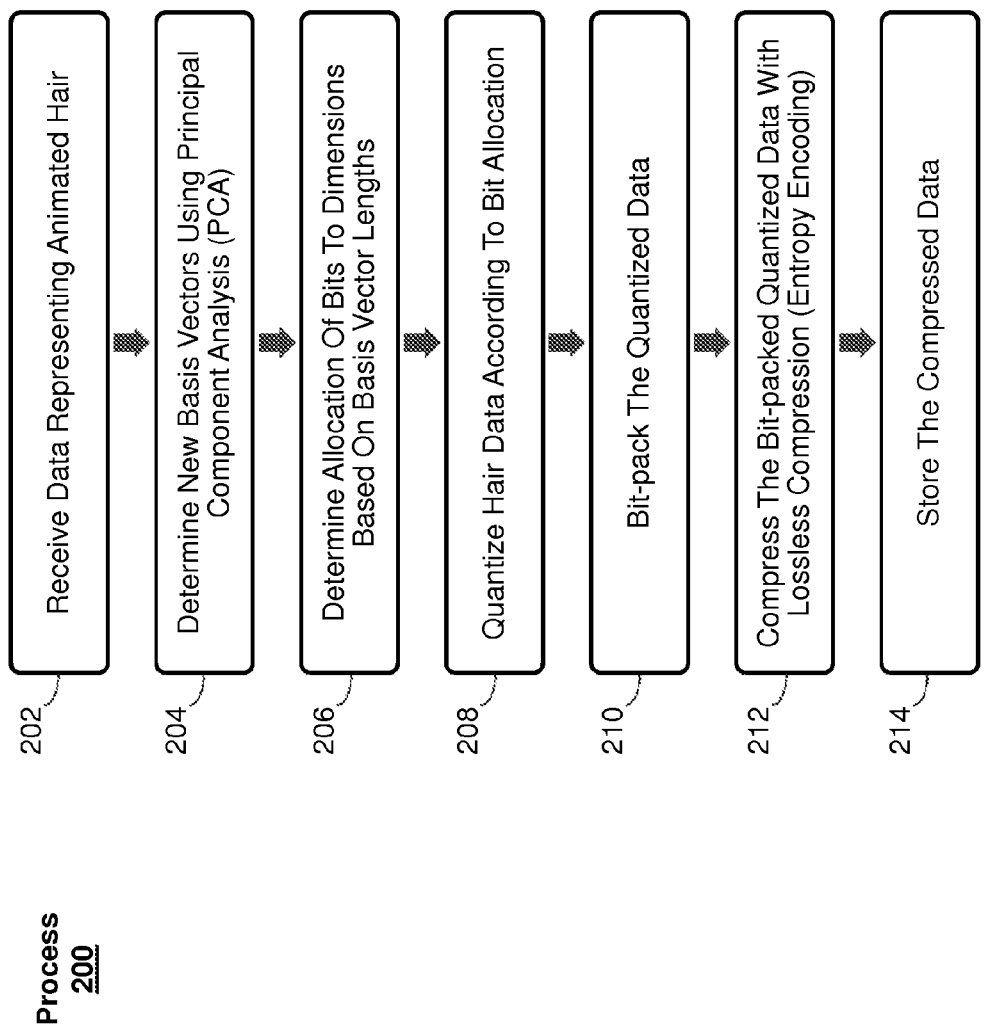
FIG. 2 illustrates an exemplary process for compressing data representing animated hair.
Figure 3A:
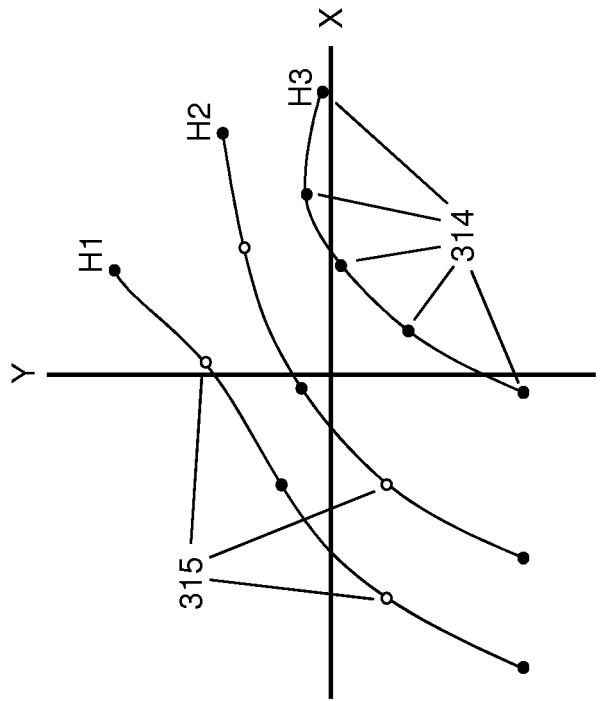
FIG. 3A illustrates exemplary animated hairs in a two-dimensional space.

FIG. 2 illustrates exemplary process 200 for compressing data representing animated hair. At block 202, data representing animated hair may be received. In one embodiment, the data representing the animated hair may include control vertices (or control points) along non-uniform rational basis splines (NURBS). For example, FIG. 3A illustrates exemplary animated hairs H1, H2, and H3 in a simplified two-dimensional (X,Y) space. The position and curvature of each hair may be at least partially defined by control vertices 314. In this example, each hair has five control vertices 314, and each control vertex may have an associated coordinate position in the (X, Y) space. In the simplified two-dimensional space shown, each hair may thus have at least ten parameters or attributes for defining the position and curvature of the hair (an X coordinate and a Y coordinate for each of the five control vertices). In some embodiments, a home position coordinate in the space may define where a hair begins, and control vertices may be defined with reference to that home position coordinate.

In other embodiments, hair may be defined in a three-dimensional (3D) CGI space, and the position of each control vertex may be defined by at least three coordinates (X, Y, Z). In addition, any number of control vertices may be used to define the position and curvature of hair. For example, two control vertices may be sufficient to define the desired curvature of one hair, while ten or more control vertices may be desired to define the curvature of another hair that may be more complex (e.g., curly, long, wavy, etc.). Different hair styles, hair lengths, and the like may thus require different numbers of control vertices. In addition to control vertices, parameters further defining hair geometry may be used such as hair radius (i.e., hair thickness) and the like.

Many additional parameters beyond geometry and control vertices may also be used to describe animated hair. For example, each hair may have a parameter or attribute defining the color of the hair. In one embodiment, an animated hair may include only one color. In other embodiments, an animated hair may include different colors at different positions (i.e., darker or lighter shades at the scalp of a character or the ends of the hair). Color may be defined in a variety of different ways. For example, hair color may be represented by three parameters: a red value, a green value, and a blue value (i.e., RGB). In other examples, hair color may be represented by a color index or color number corresponding to a particular hue of a particular color. In still other examples, separate parameters may be used to define the shade, tint, tone, or other attributes of hair color. Hair parameters may also include reference positions (e.g., X, Y, Z) of hair curves, curve tangents, or a world space as well as normal coordinates and UV coordinates of the point on a surface where a hair root is located. Likewise, rather than NURBS surfaces, hair may be defined using Bezier curves, linear poly-lines, or the like. Various parameters may thus be used to define each animated hair.

In some embodiments, it may be preferable to have an equal number of parameters for each animated hair. Having an equal number of parameters may, for example, simplify array or matrix calculations (e.g., equal-length arrays may be desired in performing PCA discussed below). However, all hairs for a character, scene, or other grouping may or may not have the same number of attributes, and they may or may not have the same number of control vertices to define their geometry. To compensate for different numbers of hair data parameters, various techniques may be employed to generate additional parameters for hairs with fewer parameters than others, or to reduce the number of parameters for hairs with more parameters than others. For example, additional parameters may be adopted from nearby hairs, extra parameters may be discarded, less important or less visible parameters may be discarded, or the like.

Figure 3B:
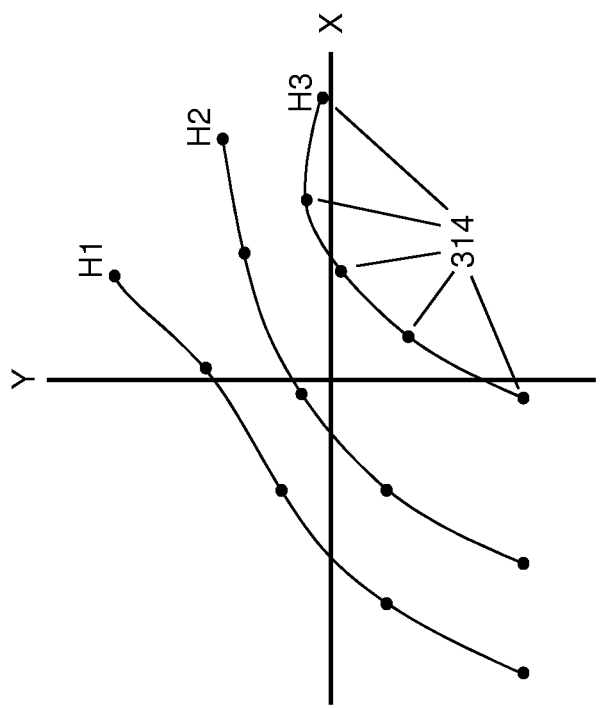
FIG. 3B illustrates exemplary interpolation to add control vertices to hair curves.

FIG. 3B illustrates one such technique to compensate for differing numbers of parameters by adding control vertices to hair curves by interpolation. In the example of FIG. 3B, hairs H1 and H2 may each have only three control vertices 314 while hair H3 may have five control vertices 314. To compensate for the different numbers of control vertices, interpolated control vertices 315 may be added to each of hairs H1 and H2. As two control vertices are needed in addition to the three control vertices 314 for each of hairs H1 and H2, one interpolated control vertex 315 may be added at a midpoint along the hair curve between each pair of control vertices, thus bringing the total for each hair to five control vertices. Alternatively, two control vertices 314 may be discarded from hair H3 such that all hairs may have only three control vertices (i.e., by removing the second and fourth control vertices). In other embodiments, similar interpolation techniques may be used for parameters other than control vertices, as will be apparent to those of ordinary skill in the art. In still other embodiments, rather than modifying hair data definitions or arrays, hair data may be grouped by number of parameters, and at least one compression step may be performed separately on hair data groups with different numbers of parameters.

Referring again to process 200 of FIG. 2, at block 204, new basis vectors may be determined by performing a PCA on the animated hair data. In some embodiments, block 204 may also include transforming the hair data to the new dimensions defined by the PCA. In one embodiment, each individual animated hair may be considered to be defined by an array of parameters. For example, the various parameters described above for defining all of the attributes of an animated hair may be grouped together in an array of parameters. Each hair in a scene, each hair on a character, a particular grouping of hair, or the like may share the same number, type, and organization of parameters (i.e., each of the related hairs may have a first parameter defining a red color value, a second parameter defining a green color value, a third parameter defining a blue color value, and so on). Alternatively, as discussed above, hair data may be modified or grouped differently to compensate for different numbers of parameters. A PCA may be performed on the various arrays of hair data parameters. The PCA may identify and rank the principal components of the group of arrays. The PCA may yield new basis vectors, varying in length, with the largest basis vector corresponding to the dimension of the grouped array data with the largest variance (i.e., where data for different hairs varies the most from other hairs), progressively down to the smallest basis vector corresponding to the dimension of the grouped array data with the least variance (i.e., where data for different hairs varies the least from other hairs). The number of principal components or new basis vectors defining a new basis for the hair data may correspond to the number of parameters in each array of hair data. In some embodiments, the covariance method may be used to perform PCA, and various software libraries may be used to perform the matrix operations.

Figure 4B:
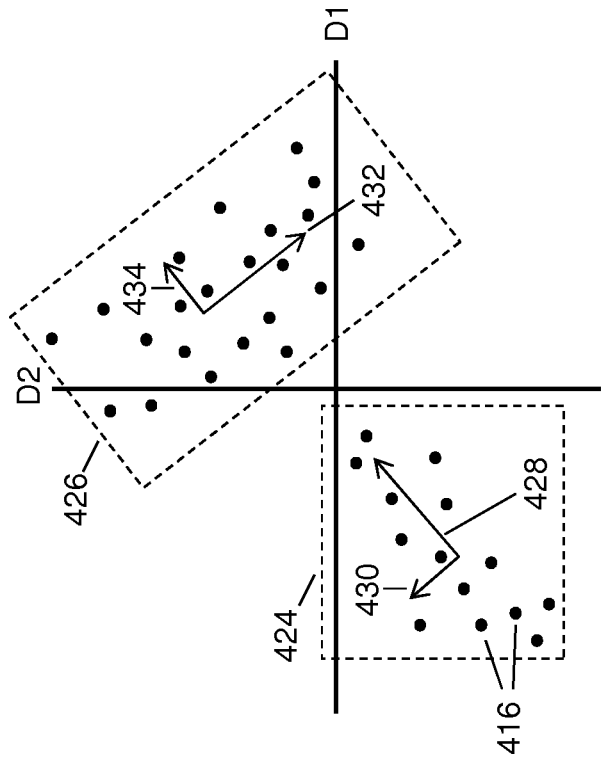
FIG. 4B illustrates exemplary cluster finding of hair data with significant variance.
Figure 4A:
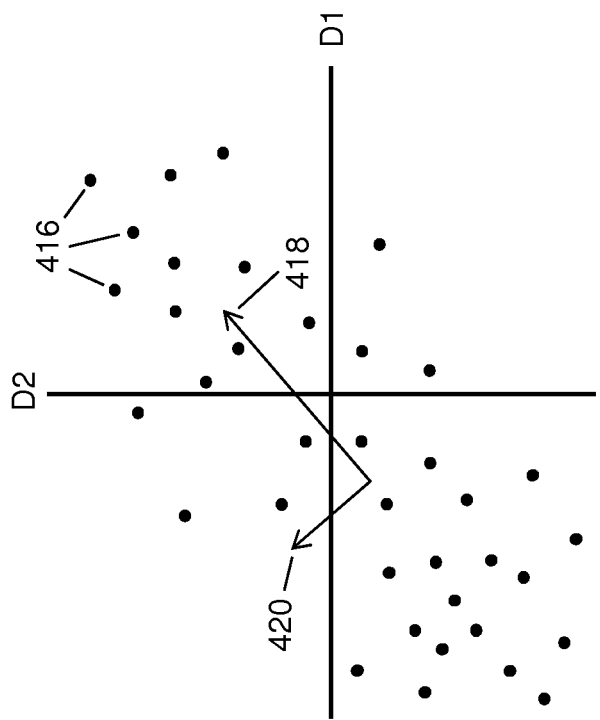
FIG. 4A illustrates an exemplary principal component analysis of a cluster of hair data points.

FIG. 4A illustrates an exemplary PCA of a cluster of hair data points. Conceptually, the arrays of hair data of parameters may be thought of as single data points 416 in a multi-dimensional space—each array of hair data of parameters may correspond to a single point 416. FIG. 4A illustrates a two-dimensional example across dimensions D1 and D2, but any number of dimensions may theoretically be used. In particular, a single hair data point 416 in the illustrated example may include only two parameters—one parameter value in the D1 dimension and another parameter value in the D2 dimension. However, data for an animated hair may consist of many parameters (e.g., 10, 20, 50, 100, 1000, 1500, or any other number of parameters per hair). The number of dimensions in the multi-dimensional space may then correspond to the number of parameters in each array of hair data (e.g., arrays of hair data with ten parameters may correspond to a single data point in a multi-dimensional space with ten dimensions). FIG. 4A may thus represent a simplified example, but the same principles and processes may apply to any number of parameters graphed in multi-dimensional spaces with any number of dimensions.

As illustrated in FIG. 4A, a grouping of arrays of hair data may form a cluster of data points 416 in the multi-dimensional space. A PCA on the hair data may result in new basis vectors 418 and 420, which may be orthogonal and have tails at the mean of all data points. The number of basis vectors resulting from the PCA may correspond to the number of parameters in each array of hair data—so in the illustrated example, two new basis vectors may have resulted as the example arrays span only two dimensions. New basis vector 418 may be longer than new basis vector 420, which may indicate that there is more variance in the cluster of data along the direction defined by new basis vector 418 than there is along the direction defined by new basis vector 420. New basis vector 418 may be a line that passes through the multi-dimensional mean and minimizes the sum of squares of the distances of the points from the line. Transforming the data based on new basis vector 418 may result in moving as much of the data variance as possible into the first dimension defined by new basis vector 418. Beneficially, the PCA on the arrays of hair data may identify new dimensions with progressively less variance, which—as discussed below—may suggest an optimal distribution of bits for quantizing and compressing the animated hair data.

However, not all hair data sets may form a single, clear cluster of hair data points. For example, in a scene with multiple characters, hair of different characters may vary significantly, and the corresponding hair data points may thus be divided or spread out. Similarly, the hair style of just one character may vary significantly across a scalp or across a body, so hair data points may be spread out. In some embodiments, a larger variance in the data being compressed may yield a less efficient compression (e.g., compressed data may be sizable, compressed data may have low fidelity, etc.). It may thus be desirable to perform cluster finding across hair data points in a multi-dimensional space to better tailor PCA (and subsequent compression) to the data.

For example, FIG. 4B illustrates exemplary cluster finding of hair data points 416 in a two-dimensional space (D1, D2) with significant variance in the data. A PCA on data points 416 may result in new basis vectors that are a poor fit for the data as they may, for example, waste bits in subsequent quantization on areas without data points (e.g., gaps, white space, etc.), lead to larger segments in subsequent quantization that combine highly variant data points, generally lead to a significant loss in precision in subsequent quantization, or the like. To compensate for the large variance in data points 416, cluster finding may be employed to identify data subsets that may be more closely related. For example, a step-wise comparison may be performed on all data points 416 to determine which data points are closest to one another, and which data points are furthest from one another in the space. Data point subsets that are close together in the space may then be segregated from other data point subsets and treated separately. Alternatively, other techniques may be employed to identify data clusters, such as connectivity-based clustering (hierarchical clustering), centroid-based clustering, clustering with Lloyd's algorithm, clustering with the expectation-maximization algorithm, or the like. Still other methods may be employed known to those of ordinary skill in the art to identify highly correlated subsets of data in a data set.

In the example of FIG. 4B, cluster finding may identify two highly correlated data subsets 424 and 426 (indicated by dashed line boxes) that may be treated separately to improve compression. Data points 416 in subset 424 may be clustered together and distant from data points 416 in subset 426, which likewise may be clustered together as illustrated. With data points 416 segregated into two different subsets 424 and 426, a PCA may be performed on each data subset separately. PCA of data subset 424 may yield new basis vectors 428 and 430, while PCA of data subset 426 may yield new basis vectors 432 and 434. Basis vectors 428, 430, 432, and 434 may better fit the data than would a single pair of basis vectors across all data points 416. In particular, the summed variance in all four new dimensions corresponding to basis vectors 428, 430, 432, and 434 may be significantly smaller than the summed variance across all data points 416 in two dimensions corresponding to a single pair of basis vectors. The smaller variance may allow for data quantization (discussed below) that better preserves the information, resulting in higher fidelity in the compressed data.

Figure 5:
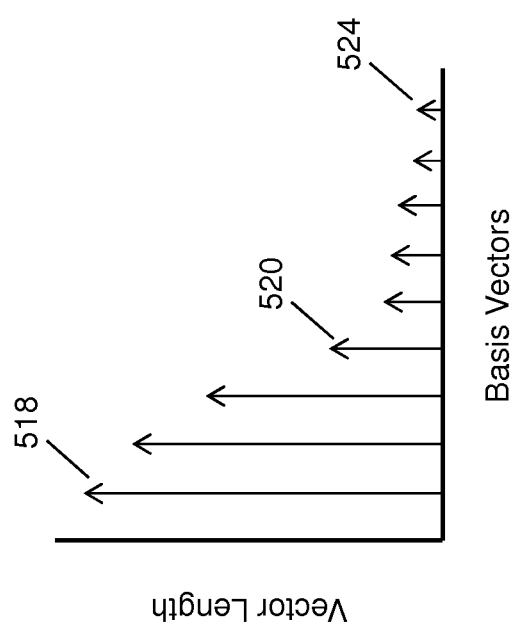
FIG. 5 illustrates length variations of exemplary basis vectors.

As mentioned above, the simplified examples illustrated herein may easily be extended to hair data with many more parameters and hair data points in theoretical spaces with many more dimensions. FIG. 5 illustrates length variations of exemplary basis vectors that may have resulted from a PCA of arrays of hair data with nine parameters each (nine-parameter arrays as inputs may yield nine new basis vectors of decreasing length). Notably, basis vector 518 is longer than basis vector 520, which is longer than basis vector 524. Similar to basis vector 418 of FIG. 4A, basis vector 518 may correspond to a dimension of a hair data cluster with the most variance. Likewise, basis vector 524 may correspond to a dimension of the hair data cluster with the least variance just as basis vector 420 of FIG. 4A. As is known with PCA, each of the basis vectors illustrated in FIG. 5 may be orthogonal to each of the other basis vectors, although only the basis vector length (or magnitude) is illustrated in FIG. 5 without direction.

With the new basis vectors defined, in some embodiments, the hair data may be transformed into the new dimensions corresponding to the new basis vectors. In other embodiments, however, the hair data points may be referenced in relation to the basis vectors without performing a transformation of all the data. In other words, referential values based on the new basis vectors may be used without performing a step of transforming all data points into the new dimensions.

In some embodiments, prior to performing PCA, various pre-processing techniques may be applied to the hair data to improve fidelity, compression efficiency, or the like. For example, prior to PCA, some or all hair curves may be rotated such that hair tips are aligned along the same axis. The amount of rotation may then be stored and used later to reverse the rotation as desired during decompression. For example, Euler angles may be stored corresponding to the hair curve rotations (and, in some instances, quantized during a later step). In some instances, aligning hair data in such a manner may improve the compressibility of hair data. Various other pre-processing techniques may also be applied to the hair data, and PCA may be performed on the pre-processed hair data as discussed above.

Referring again to process 200 of FIG. 2, at block 206, the allocation of bits to the new dimensions may be determined based on basis vector lengths, and at block 208, the hair data may be quantized according to the determined bit allocation. Quantizing the data may introduce a tradeoff between data fidelity and storage size. Although allocating more bits to store the data may produce better fidelity in the stored data, more bits occupy more storage space that could be unmanageably large or costly in some instances. Compression consistent with the present disclosure may, however, produce high fidelity data with meaningful storage size reductions by optimizing the allocation of data bits to hair data with the most information (or hair data with the most variance).

Figure 6A:
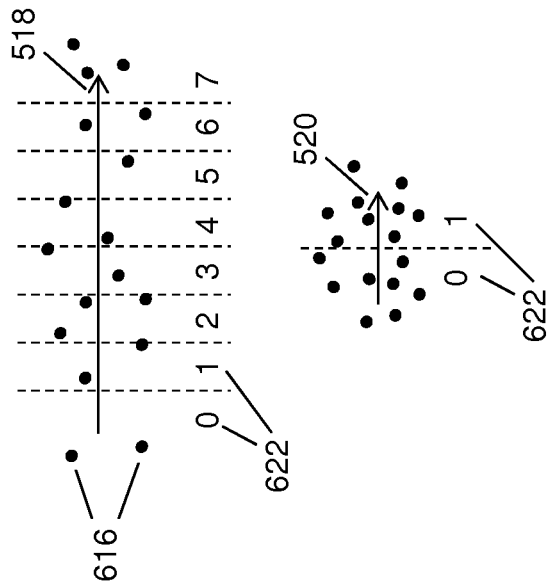
FIG. 6A illustrates exemplary quantization of data in two different dimensions.

Quantization at block 208 may include mapping hair data with significant detail onto a space with less detail, fewer gradations, or the like—in other words, mapping the large set of hair data values to a smaller set of hair data values in a many-to-few mapping. Mapping the hair data may include assigning data points representing arrays of hair data to a certain value with reference to the new basis vector corresponding to the dimension. FIG. 6A illustrates exemplary quantization of the same hair data points with two different projections in two different exemplary dimensions—a first projection where basis vector 518 is aligned along the horizontal axis, and a second projection where basis vector 520 is aligned along the horizontal axis. In each of the exemplary dimensions, hair data points 616 (corresponding to arrays of hair data mapped to a single point in a theoretical multi-dimensional space) may be assigned a segment reference value 622. For example, the two leftmost data points 616 in the dimension defined by basis vector 518 may be assigned a segment reference value of zero as those data points fall into the region corresponding to that segment reference value. Notably, with infinite precision, those two data points may not share the same value in that dimension, but quantizing the data to compress it may result in both of those data points sharing the same value in the smaller target set (with a presumably acceptable loss of precision in a tradeoff for smaller storage size).

In the illustrated example of FIG. 6A, three binary bits (eight possible values) may be used in quantizing data points 616 in the dimension corresponding to basis vector 518, while one binary bit (two possible values) may be used in quantizing data points 616 in the dimension corresponding to basis vector 520. Thus, all data points 616 may be assigned one of eight values in the dimension corresponding to basis vector 518 (in binary, 000, 001, 010, 011, and so on), and all data points 616 may be assigned one of two values in the dimension corresponding to basis vector 520 (in binary, 0 or 1). Referring again to FIG. 5, no bits may be allocated to basis vector 524, resulting in compressed hair data that has no variance in the dimension corresponding to basis vector 524 (all hair data array points may be given the same value in that dimension). This exemplary allocation of bits illustrates how the basis vector lengths resulting from PCA may suggest an optimal or preferable allocation of bits in quantization—specifically, at block 206 of process 200, for example, more bits may be allocated for quantizing the data in dimensions corresponding to longer basis vectors (e.g., vector 518) than for dimensions corresponding to shorter basis vectors (e.g., vector 520 or vector 524).

The number of bits allocated for each array of hair data (or the number of bits per hair curve or hair data point) in the target set of quantization may be manually set by a user, automatically set based on the desired storage size, determined based on a desired compression ratio, determined from the word size of a computer (32 bits, 64 bits, etc.), or determined by any of a variety of other methods. For example, one byte (or eight data bits) may be allocated to represent each hair data point 616 in the multi-dimensional space corresponding to the basis vectors of FIGS. 4 and 6A. In the example of FIGS. 4 and 6A, three bits may be allocated to the dimension corresponding to basis vector 518 (as illustrated in FIG. 6A), two bits may be allocated to each of the dimensions corresponding to the basis vectors in between basis vectors 518 and 520, and one bit may be allocated to the dimension corresponding to basis vector 520 (as illustrated in FIG. 6A) for a total of eight bits. With all eight bits utilized to describe the data points in the four dimensions corresponding to the four largest basis vectors, no bits would be allocated to the remaining dimensions corresponding to the other five basis vectors (including basis vector 524). Each data point 616 may thus be quantized down to eight bits of data describing the location of those data points in the four dimensions with the largest variance as determined by the PCA. Along with the basis vectors and the quantized data points, a quantization reference or mapping may be stored to indicate how the bits of each quantized data point are mapped in different dimensions.

Referring again to block 206 of process 200, given the number of bits allocated for each array of hair data (or each hair data point in the theoretical multi-dimensional space), a variety of techniques may be used to determine the allocation of available data bits to different dimensions. As discussed above, in the example illustrated in FIGS. 4 and 6A, eight bits may be used to describe data points 616 in four dimensions, but the distribution of bits across those four dimensions may be modified and determined in a variety of different ways. In one embodiment, both the number of bits to allocate and the distribution of bits across dimensions may be determined empirically (e.g., testing different numbers of bits and different distributions to identify desired and/or optimal values). In another embodiment, the available bits may be evenly distributed across a certain number of dimensions with the most variance (e.g., evenly distribute eight available bits across the four dimensions with the most variance yielding two bits per dimension). In yet another embodiment, starting with half the available bits or another number of bits, progressively fewer bits may be automatically assigned to the dimensions corresponding to basis vectors of progressively shorter length.

In still other embodiments, the number of available bits allocated to each dimension may be determined in part from the upper ceiling of the base two logarithm of the length of the corresponding basis vector ($\log_2$(vector length)). Based on vector lengths and the number of bits available, the length of the vector and/or the result of the logarithm may be multiplied by a number (e.g., a scalar) to yield positive results with a useful distribution of bits to vectors, or a scalar value may be added to the result of the logarithm. Such a multiplier or scalar may be determined empirically or iteratively by testing various numbers to identify a number that allocates bits in a useful or optimal way, or scalars may be determined separately for separate dimensions based at least in part on the visibility of quantization error in the data in each dimension. For example, the length of the basis vectors resulting from PCA may each be multiplied by a scalar, and the base two logarithm may be computed for each lengthened basis vector. Similarly, a scalar may be added to the logarithm of the length of the basis vectors resulting from PCA. The scaled base two logarithm results may identify a number of bits to allocate to each dimension (with negative results and/or results less than one optionally yielding no assigned bits to the corresponding dimensions). The scalar may be increased or decreased and the process repeated until a scalar is identified that results in an optimal distribution of bits (e.g., a distribution of bits that effectively captures the most information), and may also be increased or decreased based on the visibility of quantization error. In some embodiments, a binary search may be used to iteratively identify a scalar. Future compressions of similar hair data may then use the same identified scalar (or scalars) to achieve a similar distribution of bits.

In yet another embodiment, the number of bits allocated to each dimension may be determined by a percentage distribution based on length. For example, the number of available bits may be multiplied by the length of a particular basis vector divided by the sum of the lengths of all basis vectors. The multiplication results may be rounded according to any desired rounding scheme (e.g., always round up, always round down, round half up, round half down, etc.). Any excess bits may be automatically assigned to the dimension corresponding to the largest basis vector, and any bits in deficit may be taken from the dimension (or dimensions) corresponding to the shortest basis vector (or vectors).

In another embodiment, the number of bits allocated to each dimension may be determined in part by the visibility of data quantization error corresponding to those dimensions (e.g., certain dimensions or basis vectors may be weighted more heavily than others to capture more or fewer bits than length alone may suggest). For example, data corresponding to very visible changes in control vertex position may be given more bits than data corresponding to hardly visible changes in shading, regardless of the corresponding basis vector lengths. Similarly, dimensions with tangent parameter data for NURBS may be considered twice as important as dimensions with control vertex positions, so dimensions with tangent parameter data may be weighted more heavily to capture more bits. In one embodiment, the scalar or multiplier used to lengthen a new basis vector prior to determining the base two logarithm as discussed above may be weighted based on quantization error visibility. Thus, based on the visual impact quantization error may have for certain hair data compared to other hair data, various weighting factors or biases may be applied in order to ensure data that is more visible suffers less fidelity loss than data that is less visible.

Still other techniques for allocating bits to different dimensions will be apparent to those of ordinary skill in the art, and selecting a particular technique may depend on user needs, compression constraints, storage size limitations, fidelity requirements, and the like.

Referring again to block 208 of process 200, in addition to determining the number of bits for each array of hair data and the allocation of bits to each dimension, the manner in which those bits are used to quantize data in each dimension may be determined to further customize compression for various needs and circumstances. In some embodiments, the number of bits allocated to a dimension may be sufficient to accurately represent real data values, although the values may have less precision than the uncompressed values (i.e., changing from floating points with 64 bits to 32 bits). In other embodiments, however, referential values may be mapped to real data values, and the quantized hair data may be stored with referential values that can be mapped back to real data values during reconstruction.

Where referential values are used, in one embodiment, the width of the data across a dimension may be divided into equal segments, the number of segments being determined based on the number of bits allocated to the dimension (e.g., eight segments given three binary bits, two segments given one binary bit, etc.). For example, if data values in one dimension range from one to eighty, and three bits are allocated, the dimension data width of eighty may be divided into eight segments, with values from one to ten assigned a binary zero (000), values from eleven to twenty assigned a binary one (001), values from twenty-one to thirty assigned a binary two (010), and so on for all eight segments. The mapping from segment references zero to seven (000 to 111) to actual data values (one to eighty) may be stored along with the quantized data for use in decompressing and reconstructing the hair data.

The particular mapping of segment references to actual data values may be a design decision left to a user for further customizing compression. Referring again to the previous example, the first segment zero (000) could be mapped to any number from one to ten, and selecting a particular number may be done arbitrarily, may be the smallest number (one), may be the largest number (ten), may be a midpoint number (five), may be the average value of the data points in the segment, may be the median value of the data points in the segment, or may be any other number within the range. In quantizing the data, all data points that fall within a segment would then share the same value (with a presumably acceptable loss of precision in a tradeoff for smaller data size). Thus, data points that may have ranged in value from one to ten may be quantized to all share the same value of one, five, ten, or the like in that dimension. For storage purposes, each data point may have a value of zero (000) in that dimension, and an accompanying storage reference mapping may indicate that a zero (000) value—when the data is decompressed and reconstructed—should be replaced with a value of one, five, ten, or whatever value was selected.

Figure 6B:
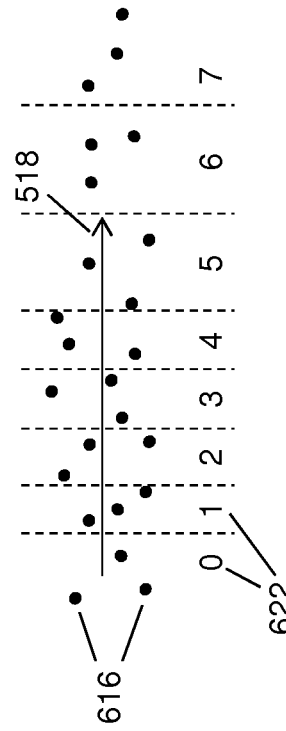
FIG. 6B illustrates exemplary non-linear quantization of data.

In other embodiments, the manner in which available bits are used to quantize data in a particular dimension may be done in a non-linear or non-uniform manner to capture information more precisely. For example, FIG. 6B illustrates exemplary non-linear quantization of data points 616 in a dimension corresponding to basis vector 518. As illustrated, quantization segments 622 may have varying widths (e.g., segment 1 is narrower than segment 6). Similar to cluster finding discussed above with reference to FIG. 4B, cluster finding may be employed to analyze how data points are distributed within a dimension in determining how to quantize data points using the available data bits. Areas where data is more compressed and/or correlated may be given segments with narrower widths, while areas where data is more broadly distributed and sparse may be given segments with wider widths. Notably, narrower segments may preserve more information than wider segments, so it may be beneficial to provide narrower segments for areas with more data points than areas with fewer data points to provide more precision to a larger percentage of data points in a dimension.

In one embodiment, a histogram approach may be employed to determine the distribution of data bits and segments (e.g., segments 622) in a dimension. Segment widths may be determined by equally dividing the data bits across the available number of segments. For example, referring again to FIG. 6B, eight segments 622 may be available (i.e., three binary bits), and twenty-four data points 616 may exist in the dimension corresponding to basis vector 518. The twenty-four data points 616 may be divided by the eight segments 622, thereby determining that three data points 616 may be allocated to each of the eight segments 622. Starting at one extreme of the data and moving toward the other extreme, segments may be delineated by grouping subsequent sets of three data points (i.e., the three data points at one extreme may define one segment, the next three data points may define another segment, and so on until the last three data points at the other extreme may define the last segment). Thus, the leftmost three data points 616 in FIG. 6B may delineate segment 0, the next three data points 616 may delineate segment 1, and so on until the rightmost three data points 616 may delineate segment 7. As discussed above, the actual value mapped to each segment may be determined in any of a variety of ways such as the median value in the segment, the mean value in the segment, or the like.

In some embodiments, the number of hair data points to allocate to a quantization segment may be determined by dividing a total number of hair data points by $2^N$, where N is the number of bits allocated to a dimension. Quantization segments may then be formed within a dimension that may have non-uniform widths such that the quantization segments capture the determined number of hair data points.

Various other techniques may also be employed while quantizing the data to distribute the available segments in a dimension and to map real data values to segment references, as will be apparent to those of ordinary skill in the art. In addition, those of ordinary skill in the art will recognize that describing data values in the new dimensions resulting from PCA may include lengthening and/or shifting the corresponding basis vector to beneficially modify how data values are defined in the dimension (e.g., shifting the basis vector to yield only positive data values or the like).

Referring again to process 200 of FIG. 2, at block 210, the quantized data may be bit-packed. Bit-packing the data may include concatenating different data portions together. For example, reference segment values in different dimensions may be bit-packed or concatenated together to form whole words, whole data sets, or the like. Bit-packing may also include organizing the data in preparation for subsequent lossless compression described below. For example, one or more headers may be constructed that provide indices, mappings, and the like that may be used to reconstruct the compressed data. Any multipliers, scalars, vector shifts, reference shifts, or the like used in quantization may be stored as part of a header. Additionally, headers may include a full set of hair data across all dimensions—including those in which no bits may have been allocated during quantization. For example, if all hair data points have the same value in a dimension, no quantization bits may have been assigned to that dimension. The common value in that dimension, however, may be stored in an uncompressed header such that it can be restored to each data point during reconstruction of the data.

A reference segment mapping may also be constructed that may correlate real data values (in a new dimension resulting from PCA) with reference segment values determined during quantization. A data header may also be constructed that includes some or all of the new basis vectors as well as their origin point resulting from PCA that may be used in reconstructing the compressed data. In some embodiments, new basis vectors and their origin may be stored uncompressed to allow data to be returned to the original basis (before PCA) during reconstruction. Likewise, any other information that may be needed to reconstruct the compressed data may be organized in a data header and may or may not be compressed. The data header or headers may be followed by the quantized hair data that may include arrays of segment references. As discussed above, the arrays of segment references may be of any length, so the arrays may be concatenated together or broken up to fit the word size of a particular computer (32 bits, 64 bits, etc.).

Referring again to process 200 of FIG. 2, at block 212, the bit-packed quantized data may be compressed using, for example, a lossless entropy encoding. In some embodiments, only the quantized hair data may be subject to entropy encoding (e.g., segment reference mappings, arrays of segment references, etc.). In other embodiments, all data relating to the hair representation may be subject to entropy encoding (e.g., all header information along with other data). In one embodiment, the quantized and bit-packed hair data may be compressed using a Lempel-Ziv standard entropy encoding approach known to those of ordinary skill in the art (e.g., Lempel-Ziv-Welch, Lempel-Ziv-Storer-Szymanski, Lempel-Ziv-Markov, etc.). In other embodiments, Huffman coding techniques, other arithmetic coding techniques, or still other compression techniques known to those of ordinary skill in the art may be employed to compress the data. In still other embodiments, the quantized data may not be further compressed at block 212, or the data may be selectively compressed based on the size of the data and need for further compression beyond quantization (e.g., compress only when the data exceeds a certain size or the storage space approaches a certain capacity limit).

Referring again to process 200 of FIG. 2, at block 214, the compressed data may be stored. As mentioned above, various headers, maps, tables, and the like may accompany the compressed data, and the collective information may be stored together. When the hair data is desired, the accompanying information may be provided in addition to the compressed data in order to decompress the data and map it back into a usable form.

Figure 7:
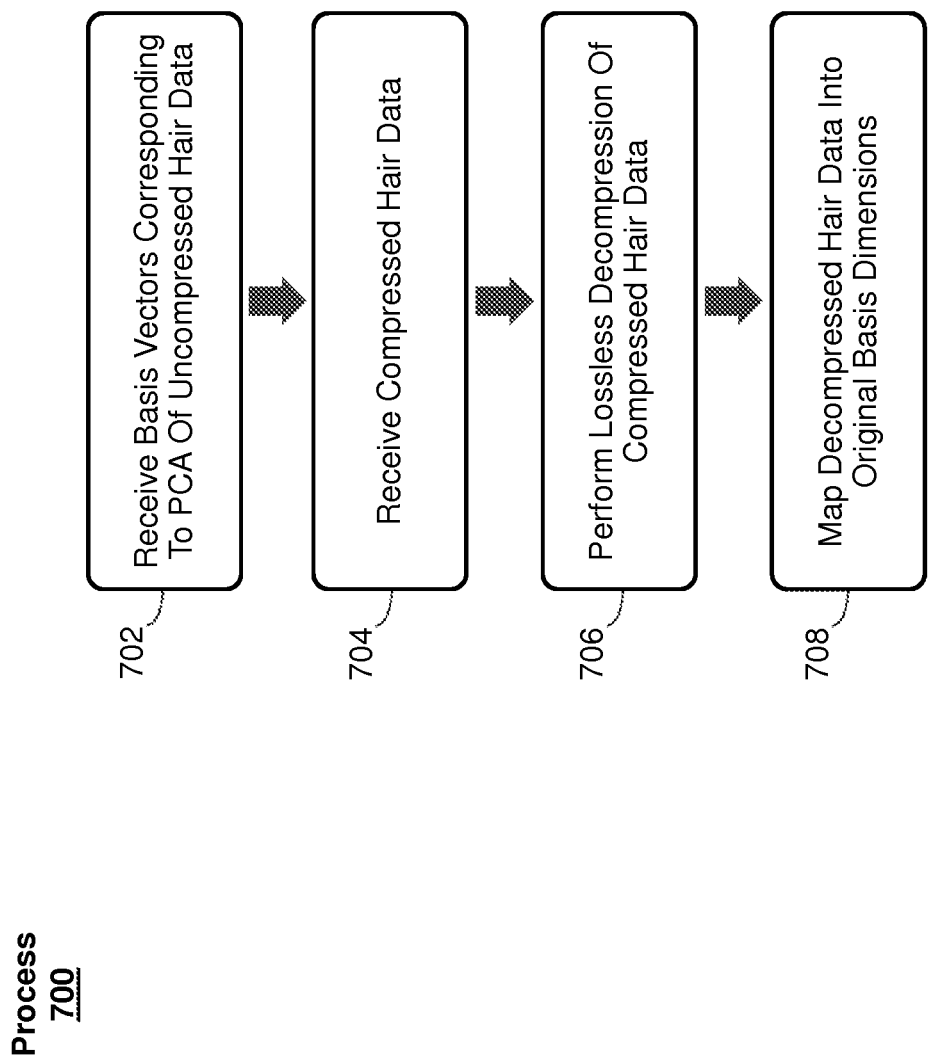
FIG. 7 illustrates an exemplary process for decompressing compressed animated hair data.

FIG. 7 illustrates exemplary process 700 for decompressing animated hair data that may have been compressed using process 200 discussed above or any of the various compression techniques discussed herein. Notably, the particular decompression steps for a particular set of compressed hair data may depend on a variety of factors including which compression techniques were used and how various compression steps may have been customized for a particular set of hair data. One of ordinary skill in the art will readily recognize the various steps that may be performed for decompressing compressed hair data, and process 700 is only provided as an illustrative example that may be modified as desired for different implementations.

At block 702, basis vectors may be received corresponding to a PCA performed on original, uncompressed arrays of hair data parameters. In some embodiments, basis vectors may be stored uncompressed. In other embodiments, basis vectors may be compressed along with other hair data. Moreover, in some embodiments, the basis vectors received may include the basis vectors resulting from the PCA performed on the original hair data, but in other embodiments, the basis vectors received may include the inverse of the PCA basis vectors or other basis vectors useful for transforming data back into the original basis dimensions.

At block 704, compressed hair data may be received. The format of the compressed hair data may vary depending on the compression techniques used. In some embodiments, compressed hair data may include an uncompressed dictionary, header, reference table, or the like useful for decompression and reconstruction. In other embodiments, uncompressed headers may indicate which compression techniques were used in order to identify which decompression methods to apply.

At block 706, lossless decompression may be performed on the compressed hair data. In some embodiments, hair data may have been compressed using a lossless compression technique. Decompressing the compressed data may include performing the known inverse operations of the lossless compression technique. For example, some lossless compression techniques may generate a dictionary or reference table, and the data may be reconstructed by mapping the compressed data to dictionary or table entries. Other examples may involve generating a reference table or dictionary during decompression as the data is processed, and that reference table or dictionary may be used to decompress subsequent data portions (e.g., as in Lempel-Ziv-Welch and the like). In other embodiments, the data may include instructions or other identifying information that indicates how the data may be decompressed (e.g., keys, tables, references, methods, etc.).

At block 708, the decompressed hair data may be mapped into the original basis dimensions to reconstruct arrays of hair data parameters. In some embodiments, mapping may include returning the decompressed hair data into the original format of the hair data before compression. Notably, the steps for reconstructing and mapping the data may be highly dependent on how the data was quantized, whether the data was transformed into a new basis, whether referential values were used during quantization, whether scalars were used in any compression step, and various other compression customizations. One of ordinary skill in the art, however, will readily recognize the inverse steps that may be used in a particular instance to reconstruct the data and map it back into its original format and dimension.

In one embodiment, referential values used during quantization may be mapped to real data values (albeit with less precision than the original data). For example, a table or mapping may be used to reconstruct arrays of hair data by inserting real data values where referential values are used. Similarly, null parameters may appear in the reconstructed arrays of hair data parameters corresponding to un-quantized dimensions of hair data (e.g., dimensions that were not allocated any bits for quantization), and those null parameters may be populated with real data values stored as part of quantization (e.g., as no bits were allocated, all hair data points may be given the same data value in that dimension). Reconstruction may allow for arrays of hair data to be generated with the same number of parameters as the original hair data before PCA or compression.

Concurrently with hair data array reconstruction or after, data values may be returned to their original basis or dimension (e.g., at block 708). In one embodiment where all data was transformed to new dimensions resulting from PCA, the reconstructed arrays of hair data may be transformed back to the original basis (e.g., using an inverse transformation). In other embodiments where some data was stored with reference to new basis vectors, the compressed data may be shifted back to the original basis or otherwise modified to return it to the original basis. In still other embodiments, some parameters may be transformed back to the original basis while other parameters may not need to be transformed at all (e.g., some values may not have changed in the new basis identified by PCA). In effect, any impact of PCA and the new basis vectors may be undone in a variety of ways, and the data may be restored to the original basis as needed based on a particular implementation. Decompression may thus return the compressed hair data to its original format with a variety of parameters for each individual hair.

Figure 8:
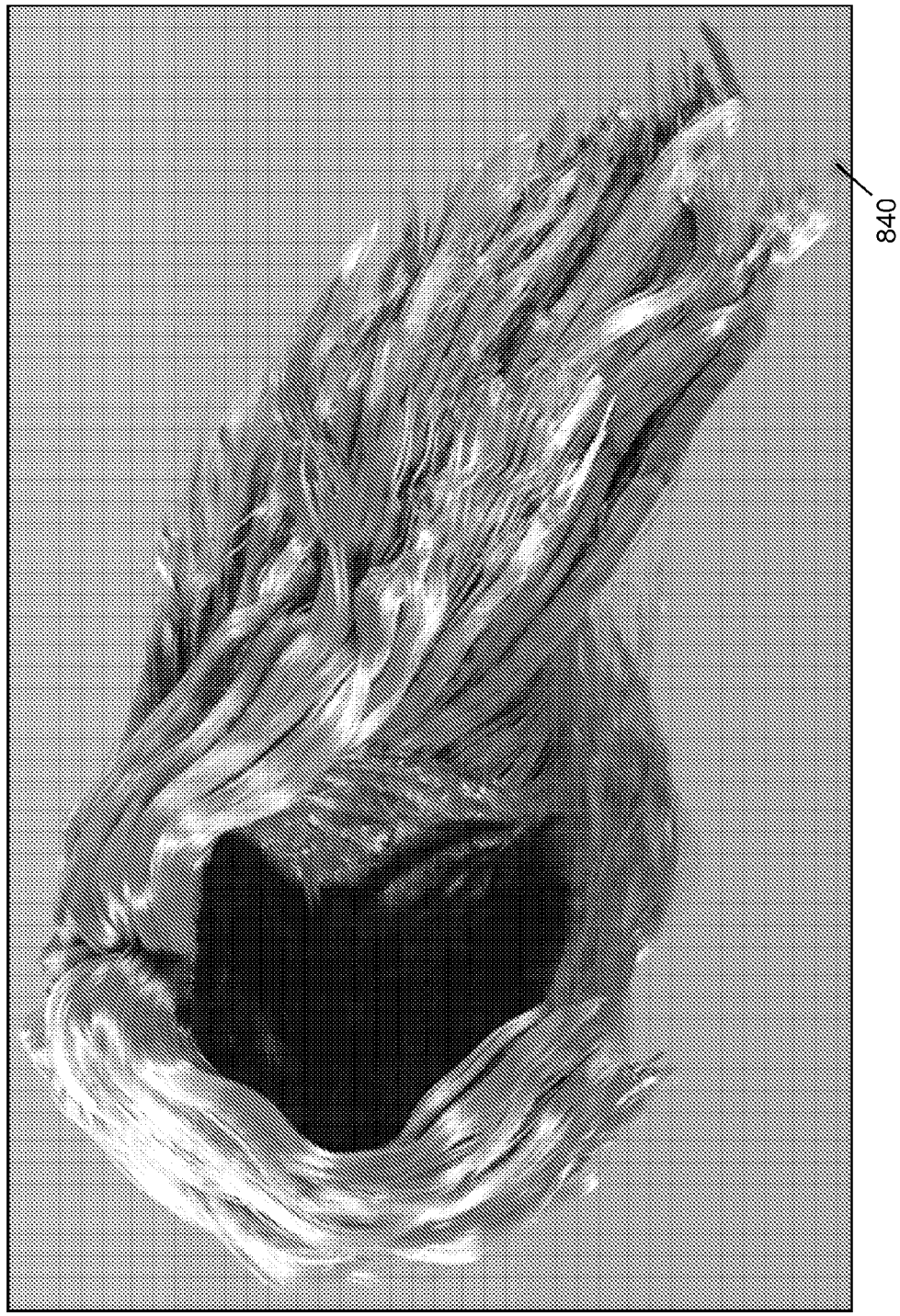
FIG. 8 illustrates exemplary uncompressed animated hair.

FIG. 8 illustrates exemplary uncompressed animated hair. As illustrated, animated hair may include significant detail with each hair being unique and separately defined. For example, hair tips 840 illustrate that each hair may have unique attributes including, for example, different location characteristics (e.g., coordinates, control vertices, etc.). In addition, the example shown in FIG. 8 illustrates how a hair style of an animated character may include a variety of hair curvature types including, for example, straight hair, curly hair, and the like. Color and shading variations may also be present in the hair style of an animated character. With such fine detail, the hair data corresponding to the example illustrated in FIG. 8 may be sizable. For example, the data representing the illustrated example may include 220 megabytes (MB) worth of data. With approximately the same amount of data duplicated in each frame, uncompressed hair data may thus be so sizable as to make it undesirable to store it without compressing it.

Figure 9:
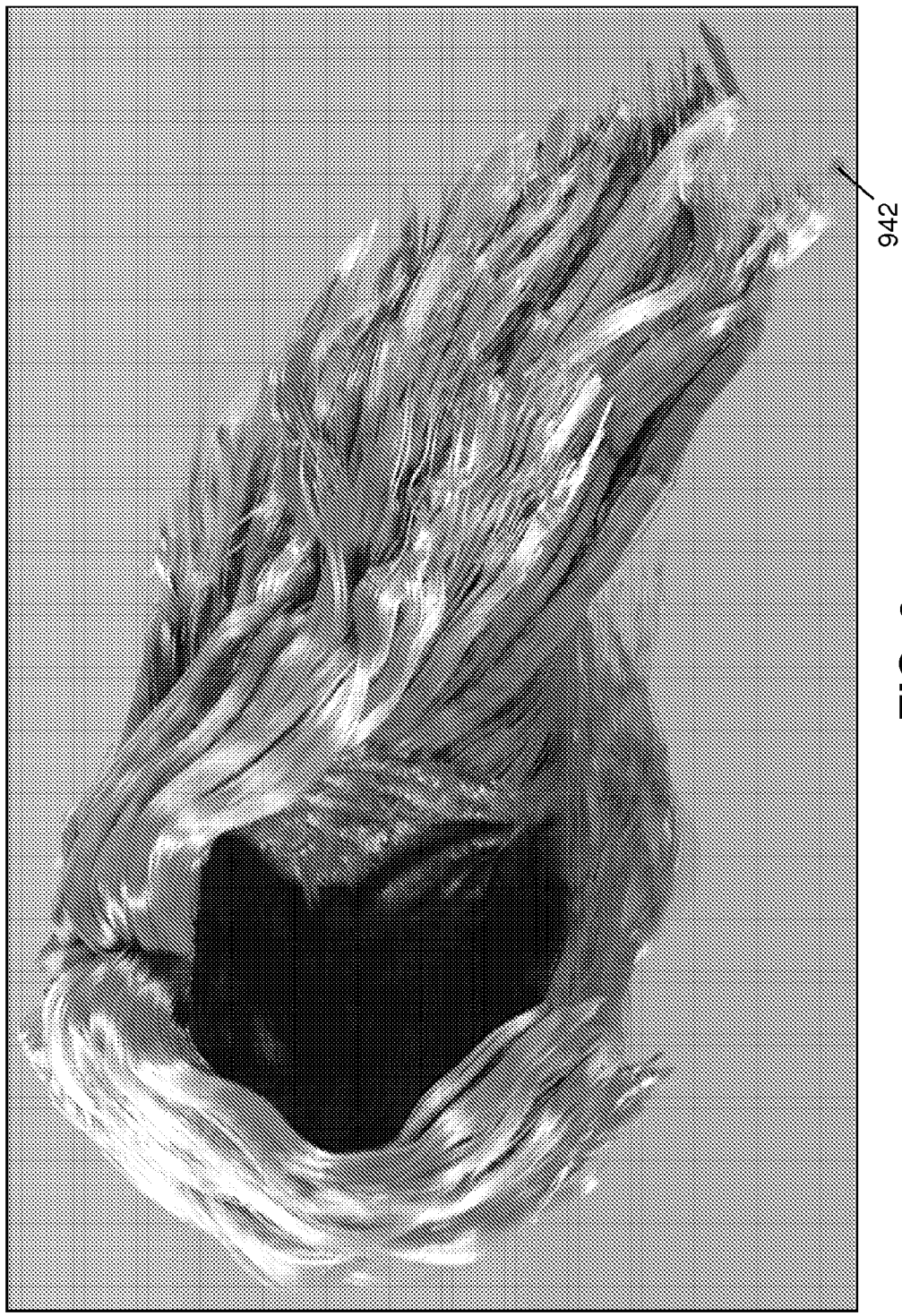
FIG. 9 illustrates exemplary animated hair after being compressed at a 5:1 ratio and decompressed.

FIG. 9 illustrates exemplary animated hair after being compressed at a 5:1 ratio (approximately) and decompressed using the various processes discussed herein. In contrast to the 220 MB size of the uncompressed hair data, the compressed hair data corresponding to the example in FIG. 9 may include around 45 MB worth of data. With a savings of around 175 MB worth of data for a hair style per frame, it may become more economical and useful to store the compressed data rather than re-processing it as needed (e.g., re-generating the full hair geometry). Notably, the quantization error or compression loss may be minimal in some instances. For example, hair tips 942 of the example illustrated in FIG. 9 are substantially similar to hair tips 840 of the example illustrated in FIG. 8. Thus, the hair data compression may have resulted in little loss to visibly noticeable hair details. As discussed above, the various compression processes discussed herein may beneficially preserve information in hair data while still accomplishing meaningful compression.

Figure 10:
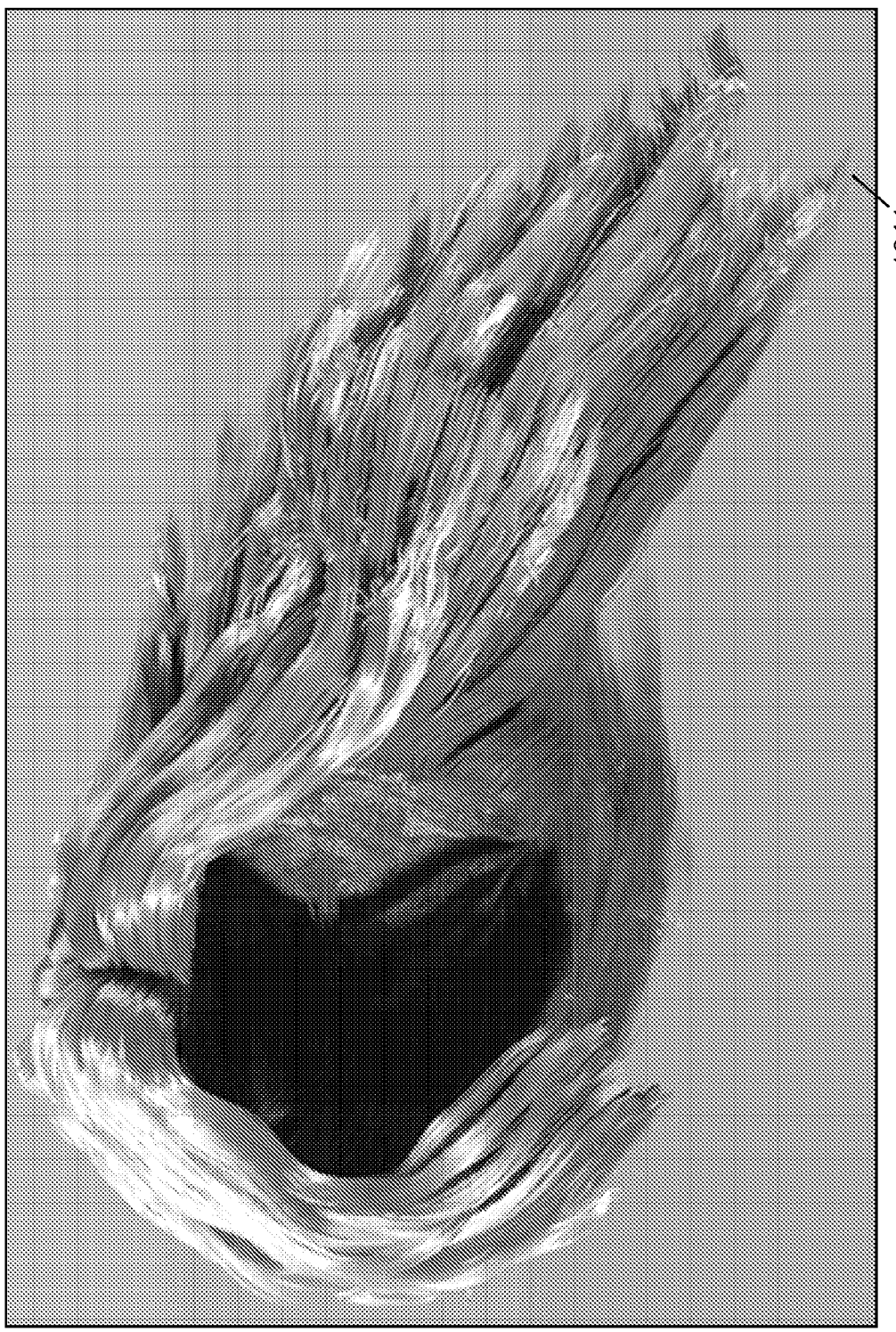
FIG. 10 illustrates exemplary animated hair after being compressed at a 20:1 ratio and decompressed.

FIG. 10 illustrates exemplary animated hair after being compressed at a 20:1 ratio (approximately) and decompressed using the various processes discussed herein. In contrast to the 220 MB size of the uncompressed hair data, the compressed hair data corresponding to the example in FIG. 10 may include around 12 MB worth of data. With a savings of around 208 MB worth of data for a hair style per frame, compression at such a ratio may make a dramatic difference in hair data storage size. Compared to the 5:1 ratio example in FIG. 9, the 20:1 ratio example in FIG. 10 may include more noticeable quantization error or compression losses. For example, hair tips 1044 of the example illustrated in FIG. 10 may have become more uniform and more closely grouped together, losing the unique distribution and curvature of hairs visible in hair tips 840 of the example illustrated in FIG. 8. Similarly, the body of hairs in the example illustrated in FIG. 10 may include fewer curvature differences (appearing more uniformly straight) than the body of hairs in the uncompressed version of FIG. 8. Thus, selecting different compression ratios may allow for customization of the various compression processes discussed herein, with such modifications being determined based on, for example, desired data sizes, desired data fidelity, and the like.

Figure 11:
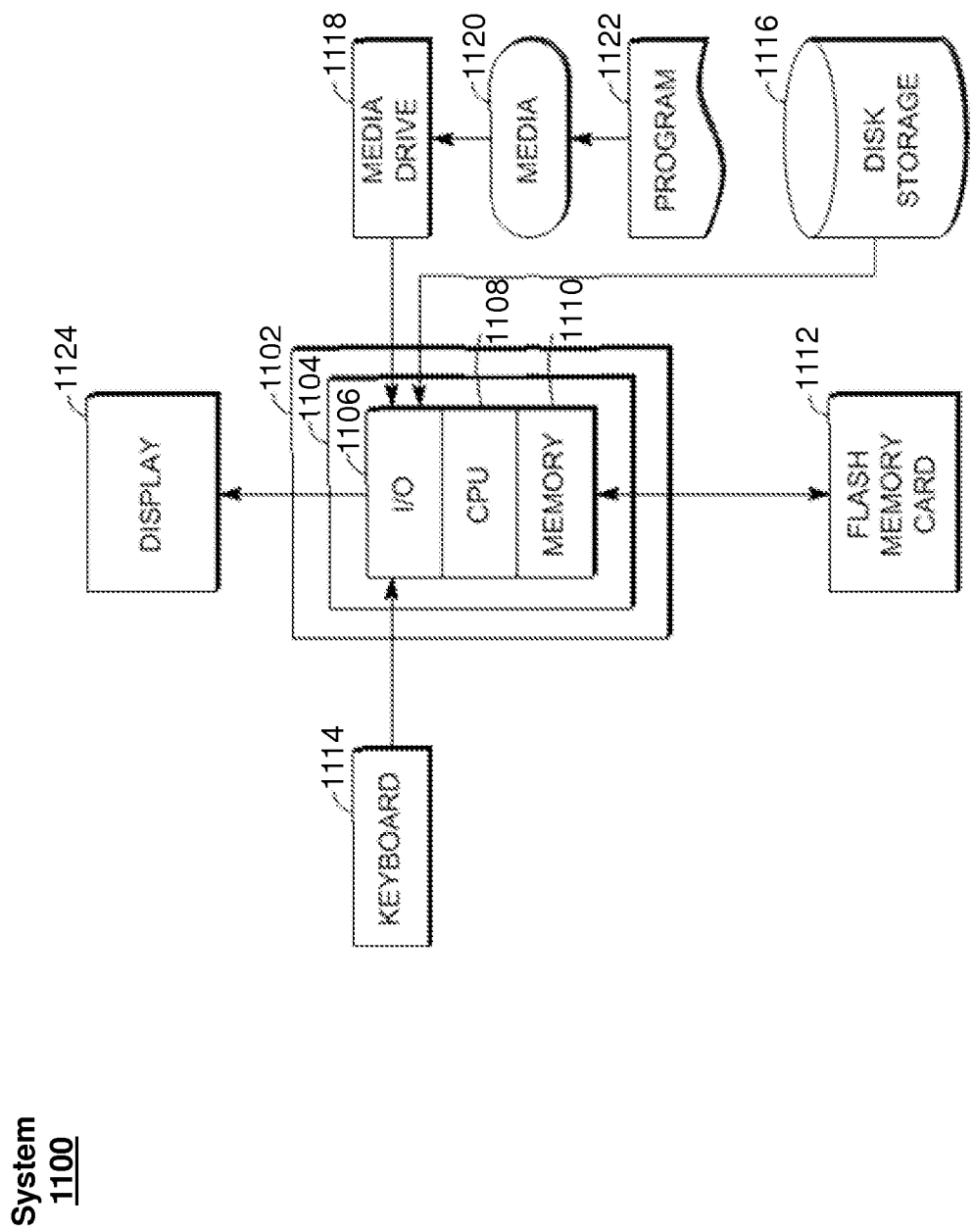
FIG. 11 illustrates an exemplary computing system.

FIG. 11 illustrates an exemplary computing system 1100 configured to perform any one of the above-described processes. In this context, computing system 1100 may include, for example, a processor (which may have multiple cores), memory, storage, and input/output devices (e.g., monitor, keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

FIG. 11 depicts an exemplary computing system 1100 with a number of components that may be used to perform the above-described processes. The main system 1102 includes a motherboard 1104 having an input/output ("I/O") section 1106, one or more central processing units ("CPU") 1108 (which may have multiple cores), and a memory section 1110, which may have a flash memory card 1112 related to it. The I/O section 1106 is connected to a display 1124, a keyboard 1114, a disk storage unit 1116, and a media drive unit 1118. The media drive unit 1118 can read/write a computer-readable medium 1120, which can contain programs 1122 or data.

At least some values based on the results of the above-described processes can be saved for subsequent use. Additionally, a non-transitory computer-readable storage medium can be used to store (e.g., tangibly embody) one or more computer programs for performing any one of the above-described processes by means of a computer. The computer program may be written, for example, in a general purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this disclosure.

What is claimed is:

1. A computer-implemented method for compressing data representing animated hair in a computer generated imagery (CGI) scene, the method comprising:
   receiving, by one or more processors, data representing animated hair, wherein the data comprises a plurality of arrays of hair data parameters;
   determining, by the one or more processors, a set of new basis vectors for the plurality of arrays of hair data parameters using principal component analysis (PCA), wherein the number of new basis vectors corresponds to the number of hair data parameters in an array;
   determining, by the one or more processors, an allocation of bits to dimensions corresponding to the set of new basis vectors based on the relative lengths of the new basis vectors, wherein a new basis vector with the greatest length is allocated more bits than a new basis vector that is shorter;
   quantizing, by the one or more processors, the hair data in the dimensions corresponding to the set of new basis vectors based on the allocation of bits;
   bit-packing, by the one or more processors, the quantized hair data;
   compressing, by the one or more processors, the bit-packed quantized hair data, wherein the compression is lossless; and
   storing the compressed hair data.

2. The computer-implemented method of claim 1, wherein the plurality of arrays of hair data parameters comprises data corresponding to control vertices of non-uniform rational basis splines, hair color, and hair radius.

3. The computer-implemented method of claim 1, further comprising:
generating, by the one or more processors, at least one additional hair data parameter for at least one array of hair data such that each array of hair data in the plurality of arrays has the same number of parameters.

4. The computer-implemented method of claim 3, wherein generating at least one additional hair data parameter for at least one array of hair data comprises:
generating, by the one or more processors, a control vertex for a non-uniform rational basis spline by interpolation.

5. The computer-implemented method of claim 1, further comprising:
transforming, by the one or more processors, the plurality of arrays of hair data parameters to the dimensions corresponding to the set of new basis vectors.

6. The computer-implemented method of claim 1, further comprising:
identifying, by the one or more processors, at least two clustered subsets of arrays in the plurality of arrays of hair data parameters, wherein a sum of a variance of data in the at least two clustered subsets is less than a variance of data in the plurality of arrays of hair data parameters; and
performing, by the one or more processors, PCA, bit allocation, and quantization separately on each of the at least two clustered subsets of arrays.

7. The computer-implemented method of claim 1, wherein determining an allocation of bits to dimensions corresponding to the set of new basis vectors comprises:
lengthening, by the one or more processors, one or more new basis vectors by multiplying the one or more new basis vectors by one or more scalars; and
determining, by the one or more processors, the allocation of bits for one or more dimensions by computing the base two logarithm of the one or more lengthened new basis vectors.

8. The computer-implemented method of claim 7, wherein the one or more scalars are determined based on visibility of quantization error in the data corresponding to each of the one or more new basis vectors.

9. The computer-implemented method of claim 1, wherein quantizing the hair data in the dimensions corresponding to the set of new basis vectors comprises:
determining, by the one or more processors, a number of hair data points to allocate to a quantization segment by dividing a total number of hair data points by $2^N$, where N is a number of bits allocated to a dimension; and
forming, by the one or more processors, quantization segments within the dimension having non-uniform widths, wherein the quantization segments capture the determined number of hair data points.

10. The computer-implemented method of claim 1, wherein compressing the bit-packed quantized hair data comprises:
performing, by the one or more processors, a Lempel-Ziv entropy encoding of the bit-packed quantized hair data.

11. The computer-implemented method of claim 1, wherein at least one dimension is allocated zero bits.

12. The computer-implemented method of claim 1, further comprising:
decompressing, by the one or more processors, the compressed bit-packed quantized hair data, wherein the decompression is lossless;
constructing, by the one or more processors, a new plurality of arrays of hair data parameters by mapping the decompressed quantized hair data to dimensions corresponding to the plurality of arrays of hair data parameters prior to PCA.

13. The computer-implemented method of claim 12, wherein constructing the new plurality of arrays of hair data parameters comprises:
performing, by the one or more processors, an inverse transformation of the quantized hair data, wherein the inverse transformation reverses a transformation to the dimensions corresponding to the set of new basis vectors determined using PCA.

14. A non-transitory computer-readable storage medium comprising computer-executable instructions for compressing data representing animated hair in a computer generated imagery (CGI) scene, the computer-executable instructions comprising instructions for:
receiving data representing animated hair, wherein the data comprises a plurality of arrays of hair data parameters;
determining a set of new basis vectors for the plurality of arrays of hair data parameters using principal component analysis (PCA), wherein the number of new basis vectors corresponds to the number of hair data parameters in an array;
determining an allocation of bits to dimensions corresponding to the set of new basis vectors based on the relative lengths of the new basis vectors, wherein a new basis vector with the greatest length is allocated more bits than a new basis vector that is shorter;
quantizing the hair data in the dimensions corresponding to the set of new basis vectors based on the allocation of bits;
bit-packing the quantized hair data;
compressing the bit-packed quantized hair data, wherein the compression is lossless; and
storing the compressed hair data.

15. The computer-readable storage medium of claim 14, the computer-executable instructions further comprising instructions for:
identifying at least two clustered subsets of arrays in the plurality of arrays of hair data parameters, wherein a sum of a variance of data in the at least two clustered subsets is less than a variance of data in the plurality of arrays of hair data parameters; and
performing PCA, bit allocation, and quantization separately on each of the at least two clustered subsets of arrays.

16. The computer-readable storage medium of claim 14, wherein determining an allocation of bits to dimensions corresponding to the set of new basis vectors comprises:
lengthening one or more new basis vectors by multiplying the one or more new basis vectors by one or more scalars; and
determining the allocation of bits for one or more dimensions by computing the base two logarithm of the one or more lengthened new basis vectors.

17. The computer-readable storage medium of claim 14, wherein quantizing the hair data in the dimensions corresponding to the set of new basis vectors comprises:
determining a number of hair data points to allocate to a quantization segment by dividing a total number of hair data points by $2^N$, where N is a number of bits allocated to a dimension; and forming quantization segments within the dimension having non-uniform widths, wherein the quantization segments capture the determined number of hair data points.

18. A system for compressing data representing animated hair in a computer generated imagery (CGI) scene, the system comprising:
a memory configured to store data; and
a computer processor configured to:
receive data representing animated hair, wherein the data comprises a plurality of arrays of hair data parameters;
determine a set of new basis vectors for the plurality of arrays of hair data parameters using principal component analysis (PCA), wherein the number of new basis vectors corresponds to the number of hair data parameters in an array;
determine an allocation of bits to dimensions corresponding to the set of new basis vectors based on the relative lengths of the new basis vectors, wherein a new basis vector with the greatest length is allocated more bits than a new basis vector that is shorter;
quantize the hair data in the dimensions corresponding to the set of new basis vectors based on the allocation of bits;
bit-pack the quantized hair data;
compress the bit-packed quantized hair data, wherein the compression is lossless; and
store the compressed hair data.

19. The system of claim 18, the computer processor further configured to:
identify at least two clustered subsets of arrays in the plurality of arrays of hair data parameters, wherein a sum of a variance of data in the at least two clustered subsets is less than a variance of data in the plurality of arrays of hair data parameters; and
perform PCA, bit allocation, and quantization separately on each of the at least two clustered subsets of arrays.

20. The system of claim 18, wherein determining an allocation of bits to dimensions corresponding to the set of new basis vectors comprises:
lengthening one or more new basis vectors by multiplying the one or more new basis vectors by one or more scalars; and
determining the allocation of bits for one or more dimensions by computing the base two logarithm of the one or more lengthened new basis vectors.

21. The system of claim 18, wherein quantizing the hair data in the dimensions corresponding to the set of new basis vectors comprises:
determining a number of hair data points to allocate to a quantization segment by dividing a total number of hair data points by $2^N$, where N is a number of bits allocated to a dimension; and
forming quantization segments within the dimension having non-uniform widths, wherein the quantization segments capture the determined number of hair data points.

22. A computer-implemented method for decompressing and reconstructing compressed data representing animated hair in a computer-generated imagery (CGI) scene, the method comprising:
receiving, by one or more processors, a set of basis vectors corresponding to a principal component analysis (PCA) performed on a first plurality of arrays of hair data parameters;
receiving, by the one or more processors, compressed data representing animated hair;
performing, by the one or more processors, lossless decompression of the compressed hair data, wherein the decompressed hair data comprises a second plurality of arrays of hair data parameters transformed from an original basis to a new basis corresponding to the set of basis vectors; and
mapping, by the one or more processors, the second plurality of arrays of hair data parameters into a third plurality of arrays of hair data parameters in dimensions corresponding to the original basis to reconstruct the decompressed hair data.

23. The computer-implemented method of claim 22, further comprising:
mapping, by the one or more processors, a referential quantization value in the decompressed hair data to a corresponding real data value.

24. The computer-implemented method of claim 22, further comprising:
receiving, by the one or more processors, a stored hair data parameter; and
populating, by the one or more processors, a null parameter in the third plurality of arrays of hair data parameters with the stored hair data parameter, wherein the null parameter corresponds to an un-quantized domain in the new basis.

25. A non-transitory computer-readable storage medium comprising computer-executable instructions for decompressing and reconstructing compressed data representing animated hair in a computer-generated imagery (CGI) scene, the computer-executable instructions comprising instructions for:
receiving a set of basis vectors corresponding to a principal component analysis (PCA) performed on a first plurality of arrays of hair data parameters;
receiving compressed data representing animated hair;
performing lossless decompression of the compressed hair data, wherein the decompressed hair data comprises a second plurality of arrays of hair data parameters transformed from an original basis to a new basis corresponding to the set of basis vectors; and
mapping the second plurality of arrays of hair data parameters into a third plurality of arrays of hair data parameters in dimensions corresponding to the original basis to reconstruct the decompressed hair data.

26. The computer-readable storage medium of claim 25, the computer-executable instructions further comprising instructions for:
mapping a referential quantization value in the decompressed hair data to a corresponding real data value.

27. The computer-readable storage medium of claim 25, the computer-executable instructions further comprising instructions for:
receiving a stored hair data parameter; and
populating a null parameter in the third plurality of arrays of hair data parameters with the stored hair data parameter, wherein the null parameter corresponds to an un-quantized domain in the new basis.

28. A system for decompressing and reconstructing compressed data representing animated hair in a computer-generated imagery (CGI) scene, the system comprising:
a memory configured to store data; and
a computer processor configured to:
receive a set of basis vectors corresponding to a principal component analysis (PCA) performed on a first plurality of arrays of hair data parameters;

receive compressed data representing animated hair;

perform lossless decompression of the compressed hair data, wherein the decompressed hair data comprises a second plurality of arrays of hair data parameters transformed from an original basis to a new basis corresponding to the set of basis vectors; and map the second plurality of arrays of hair data parameters into a third plurality of arrays of hair data parameters in dimensions corresponding to the original basis to reconstruct the decompressed hair data.

29. The system of claim 28, the computer processor further configured to:

map a referential quantization value in the decompressed hair data to a corresponding real data value.

30. The system of claim 28, the computer processor further configured to:

receive a stored hair data parameter; and populate a null parameter in the third plurality of arrays of hair data parameters with the stored hair data parameter, wherein the null parameter corresponds to an un-quantized domain in the new basis.

* * * * *